United States Patent [19]

Templeton et al.

[11] Patent Number: 5,555,794
[45] Date of Patent: Sep. 17, 1996

[54] ADJUSTABLE HINGE APPARATUS

[75] Inventors: Robert J. Templeton, Danville; Robert S. Ragan, Brownsburg, both of Ind.

[73] Assignee: SaniServ, Inc., Indianapolis, Ind.

[21] Appl. No.: 476,620

[22] Filed: Jun. 7, 1995

[51] Int. Cl.⁶ .................. A47J 37/06; A47J 37/12
[52] U.S. Cl. .................. 99/349; 99/353; 99/377; 99/379; 100/93 P; 100/266
[58] Field of Search .................. 99/326–328, 330–332, 99/335, 336, 340–349, 374–380, 390, 391, 400, 383, 394, 424–426, 430; 219/524, 525, 443; 426/523, 438; 100/93 P, 233, 266, 292, 194, 195; 126/39 H, 41 R

[56] References Cited

U.S. PATENT DOCUMENTS

| | | | |
|---|---|---|---|
| 2,748,690 | 6/1956 | Lipsich et al. | 99/340 |
| 3,473,465 | 10/1969 | Tonjum | 99/349 |
| 3,567,065 | 3/1971 | Dinse | 220/31 |
| 3,750,563 | 8/1973 | Tonjum | 100/194 |
| 4,224,864 | 9/1980 | Wendell | 100/266 |
| 4,586,428 | 5/1986 | Adamson | 99/379 |
| 4,697,504 | 10/1987 | Keating | 126/41 R |
| 4,972,766 | 11/1990 | Anetsberger | 219/524 |
| 4,987,827 | 1/1991 | Marquez | 99/331 |
| 5,095,813 | 3/1992 | Escamilla et al. | 100/93 P |
| 5,138,938 | 8/1992 | McClean | 219/525 |
| 5,178,059 | 1/1993 | Eschlboeck et al. | 99/349 |
| 5,197,377 | 3/1993 | Jennings et al. | 99/379 |
| 5,247,874 | 9/1993 | George, II et al. | 99/353 |

*Primary Examiner*—Timothy F. Simone
*Attorney, Agent, or Firm*—Barnes & Thornburg

[57] ABSTRACT

The present invention relates to an adjustable hinge apparatus for use with a cooker having multiple stacked heating plates and a support pin extending across one side of the cooker to form a common pivot axis. The hinge apparatus includes an array of adjustable hinges formed to be positioned adjacent one another on the support pin. Each hinge includes a hinge block having a pivot aperture sized for sliding movement of the support pin therein and an arm extending away from the hinge block. The arms of adjacent hinges are formed for attachment with consecutively stacked heating plates and the hinge block of each hinge is formed to slide on the support pin perpendicular to the pivot axis and independently of adjacent hinges. Thus, the hinging apparatus in accordance with the present permits variable spacing and free floating vertical movement between heating plates, and prevents relative horizontal movement between the plates by maintaining a common pivot point for all plates in the various positions.

55 Claims, 3 Drawing Sheets

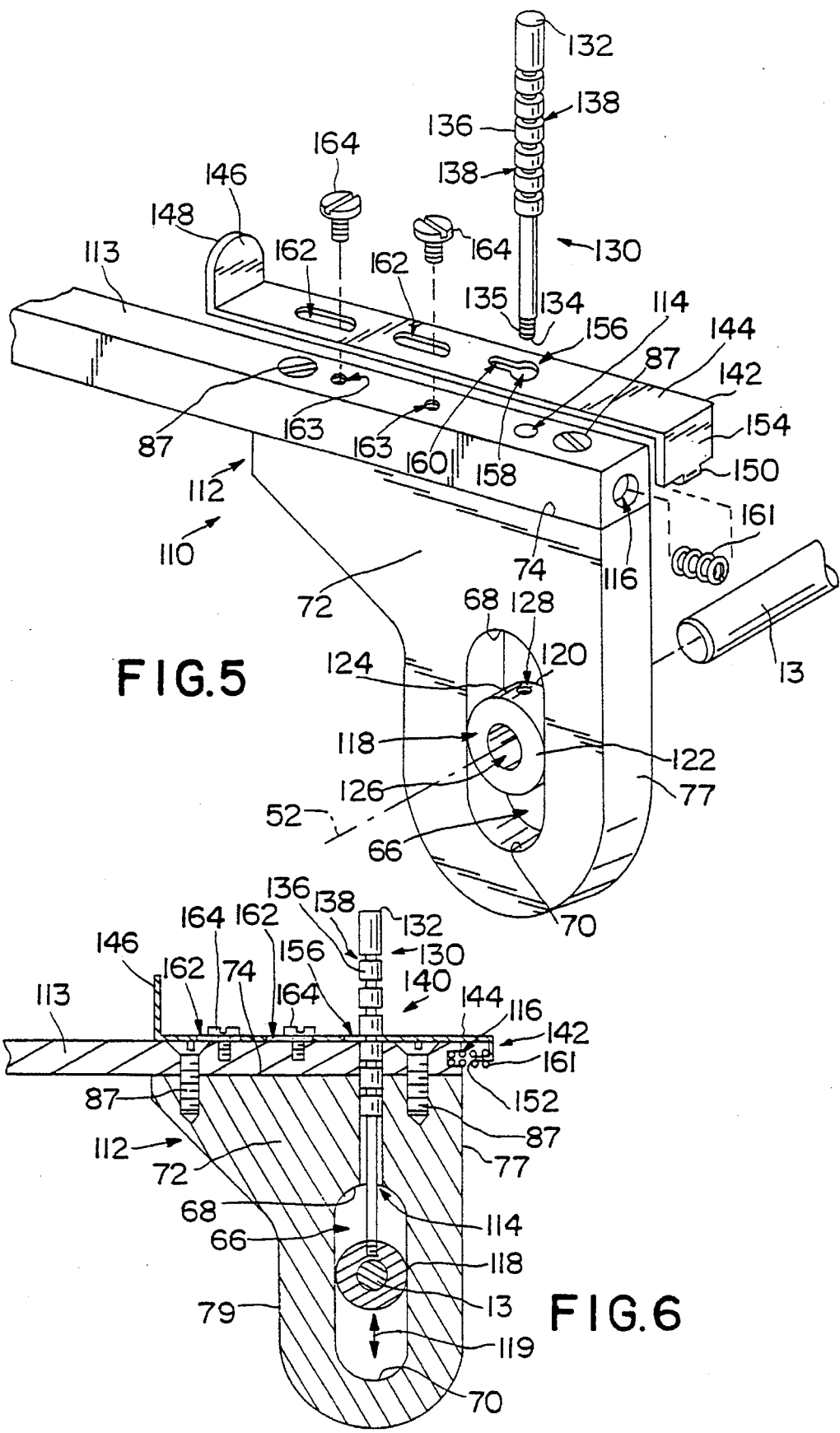

ADJUSTABLE HINGE APPARATUS

BACKGROUND AND SUMMARY OF THE INVENTION

The present invention relates to a hinge apparatus. More particularly, the present invention relates to an adjustable hinge apparatus for use with a heating appliance for foodstuffs.

It is often beneficial to utilize cookers having multi-layer stacked heating plates in kitchens of cafeterias and fast-food restaurants. Such a multi-layer cooker permits a chef to simultaneously heat opposite sides of a foodstuff. In addition, a chef using a multi-layer cooker with three or more heating plates can increase the volume of food produced per area of kitchen space. However, foodstuffs (eg. pre-formed hamburgers)often have different thicknesses, which can make it difficult to maintain good mechanical contact between the plates and the foodstuffs resting therebetween. It is advantageous to maintain mechanical contact between the plates and the foodstuff to ensure that a satisfactory heating temperature exists within the foodstuff. Often the heating temperature within the foodstuff must be maintained at a level sufficient to kill bacteria such as *Escherichia coli*.

A variety of devices have been used to preselect a fixed height between heating plates or cooking areas containing such plates. For example, conventional hinge apparatuses have been used in U.S. Pat. No. 4,987,827 to Marquez. Hinge apparatuses having multiple parts and wire racks have also been used with double sided cooking areas. See U.S. Pat. No. 2,748,690 to Lipsich et al. What is needed is an adjustable hinge apparatus for a cooker having multiple stacked heating plates that allows the each of the plates to self-adjust to the thickness of the foodstuff being cooked, while permitting the chef to simultaneously pivot the heating plates about a common pivot axis to remove foodstuffs from a chosen plate.

According to one object of the present invention, an adjustable hinge apparatus is provided for use with a cooker having multiple stacked heating plates and a support pin extending across one side of the cooker to form a common pivot axis. The hinge apparatus comprises an array of adjustable hinges formed to be positioned adjacent one another on the support pin. Each hinge includes a hinge block having a pivot aperture sized for sliding movement of the support pin therein and an arm extending away from the hinge block. The arms of adjacent hinges are formed for attachment with consecutively stacked heating plates and the hinge block of each hinge is formed to slide on the support pin perpendicular to the pivot axis and independently of adjacent hinges. Therefore, the adjustable hinge apparatus of the present invention allows the heating plates to self-adjust relative to one another to accommodate various thickness of foodstuff therebetween and permits the chefs to pivot the stacked heating plates simultaneously about the common pivot axis.

In preferred embodiments of the present invention, two sets of adjustable hinges are situated on opposite ends of the support pin in spaced-apart relation to one another. Each set includes three hinges positioned in a mirror-image orientation relative to one another. The sets of hinges include an inner hinge formed for attachment to a top plate, a center hinge formed for attachment to a middle plate, and an outer hinge formed for attachment with a lower plate of the cooker. In addition, the hinges are held in their side-by-side orientation by bushings which promote the independent sliding of the hinge blocks relative to one another and permit the hinge blocks to tilt to an ajar orientation to accommodate various thickness of foodstuff between the plates. Ideally, the sets are prevented from sliding on the support pin parallel to the pivot axis by spacers. These spacers are attached to the support pin and positioned in spaced-apart relation to one another between the sets.

Further, in accordance with the present invention, the hinge block of each hinge includes a top edge and a bottom edge and the arm of each hinge is attached to the top edge. In addition, the pivot aperture is elliptical in shape and includes a highest portion adjacent the top edge and a lowest portion adjacent the bottom edge. Moreover, the height of the hinge block above the highest portion of the pivot aperture may be varied so that the arm will align with the height of the heating plate to which it is attached. A first end of each arm is formed for attachment with the respective heating while the second opposite end is attached to the top edge of the hinge block. Each arm also includes a central portion which is normally offset at an angle to permit multiple hinge blocks to ride side-by-side on the hinge pin and multiple arms to be stacked generally perpendicular to the pivot axis.

In accordance with another embodiment of the present invention the apparatus includes individual latch means formed to interact with each of the hinges. Each latch securely fastens the hinges onto the support pin to yieldably prevent perpendicular sliding of the hinge blocks on said support pin. To cooperate with the latch means, the hinges described above are modified to include a rod slot extending through the arm and between the top edge and the highest portion of the pivot aperture.

The latching means itself includes an annular hinge bearing positioned about the support pin in the pivot aperture, a notched adjusting rod extending through the rod slot and being coupled to the bearing, and a latch resting upon the arm and normally biased into engagement with the notches within the adjusting rod to block sliding movement of the adjusting rod within the rod slot. Thus, the latching means securely fastens the adjusting rod within the rod slot so that the top edge of the hinge block is prevented from moving perpendicular relative to the common pivot axis on the support pin.

Advantageously, the hinge apparatus in accordance with the present invention allows the plates of a multiplate heating apparatus to be hinged individually and to pivot as one when accessing other than the top plate. This united pivoting movement prevents any relative horizontal movement between the plates which would distort and damage the foodstuff between the plates. In addition, the ability of the plates to move vertically with respect to each other allows the chef to simultaneously heat various products which may be of different thicknesses. Further beneficially, the hinging apparatus allows the plates to tilt to ajar orientations in order to maintain good mechanical contact between the heating plate and all of the product on said plate. Thus, the hinging apparatus in accordance with the present permits variable spacing between plates, allows free floating vertical movement between plates, and prevents relative horizontal movement between plates by maintaining a common pivot point for all plates in the various positions.

Additional objects, features and advantages of the invention will become apparent to those skilled in the art upon consideration of the following detailed description and preferred embodiments exemplifying the best mode of carrying out the invention as presently perceived.

BRIEF DESCRIPTION OF THE DRAWINGS

A detailed description refers particularly to the accompanying figures in which:

FIG. 5 is an exploded apparatus view of an alternative embodiment of the hinge apparatus of the present invention showing an annular hinge bearing formed for sliding movement within the pivot aperture of the hinge block and extension of the support pin therethrough, an adjusting rod, a locking latch having a locking notch extending therethrough, and a biasing spring; and FIG. 6 is an assembled cross-sectional side view of the hinge of FIG. 5 showing the hinge block having a rod slot extending therein, the locking notch of the locking latch aligned with the rod slot, and the adjusting rod in locking engagement with the annular hinge bearing so that the hinge block may undergo sliding movement on the support pin.

DETAILED DESCRIPTION OF THE DRAWINGS

Figure 1:
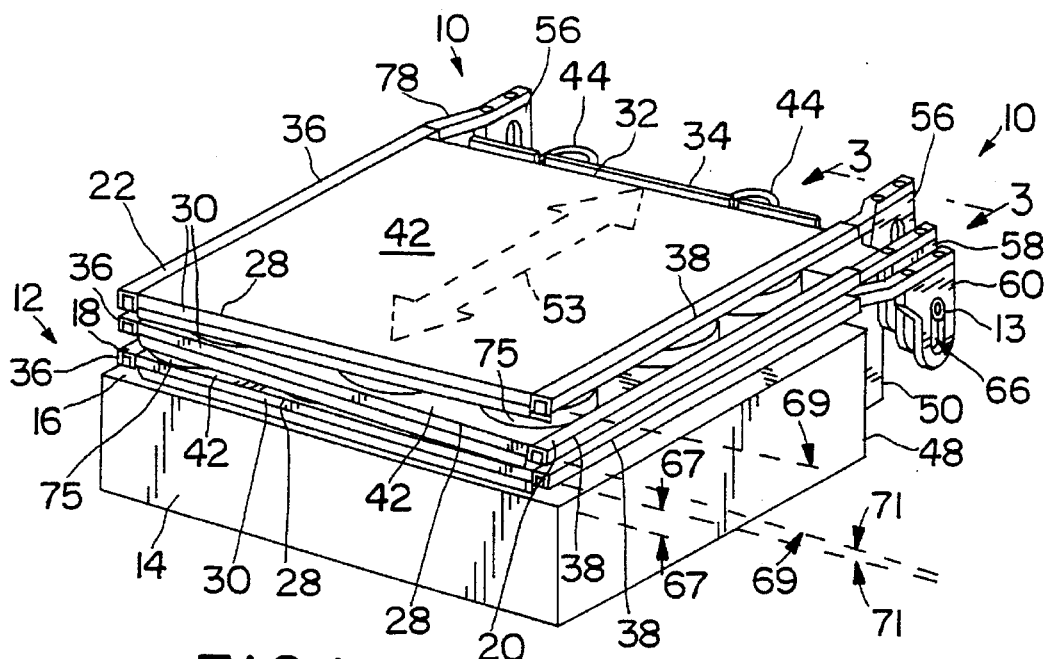
FIG. 1 is a perspective view of two adjustable hinge apparatuses in accordance with the present invention mounted on a support pin of a cooking apparatus having three stacked heating plates with foodstuff positioned therebetween.

Two adjustable hinge apparatuses 10 in accordance with the present invention are shown in FIG. 1 as they would appear to a user after being mounted onto a multilayer cooker 12. Each apparatus 10 is positioned in spaced-apart relation relative to the other on the cooker 12. Illustratively, each hinge apparatus 10 is a mirrorimage of the other and is mounted for both pivotable movement on a support pin 13 and sliding movement generally perpendicular to the pin 13.

Figure 2:
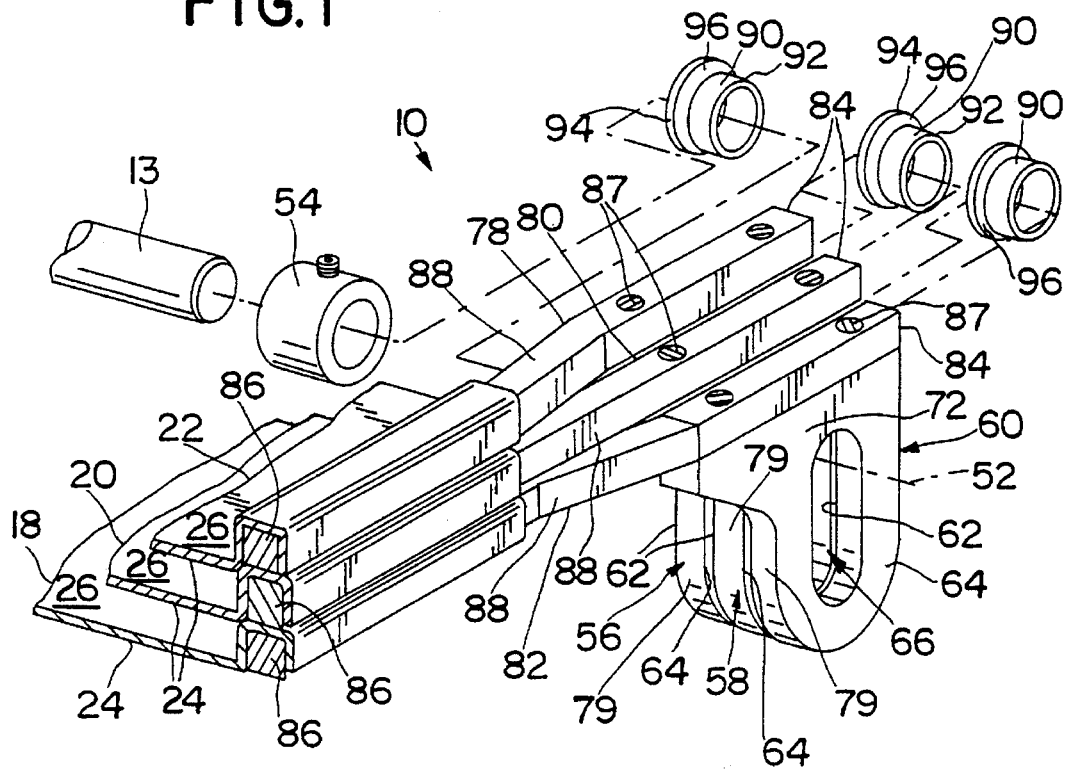
FIG. 2 is an enlarged assembly view of one of the hinge apparatuses of FIG. 1 showing an inner hinge coupled to a top heating plate, a center hinge coupled to a middle heating plate, an outer hinge coupled to a lower heating plate, bushings formed for positioning between the individual hinges, a spacer, and the support pin formed for extension through the spacer, the hinges, and the bushings.

Illustratively, cooker 12 includes a lower housing 14 having a stationary heating surface 16 positioned thereon, a lower heating plate 18 formed to rest on the stationary surface 24, a middle heating plate 20 formed to rest upon the lower heating plate 18, and a top heating plate 22 formed to rest upon the middle heating plate 20. As best shown in FIG. 2, each of the heating plates 18, 20, 22 includes a bottom side 24 facing the lower housing 14 and an opposite top side 26. In addition, the plates 18, 20, 22 include a front edge 28 having a tip 30, a back edge 32 having an upstanding tab 34, and opposite side edges 36, 38 each having hinge attachment means (not shown) formed therein. Preferably, a glycol heating element 42 is supported on the top side 26 of the heating plates 18, 20, 22 and in fluid communication, via glycol tubes 44, with lower housing 14. While the illustrated embodiment contemplates three movable layered plates 18, 20, 22 it is understood that greater or fewer plates 18, 20, 22 could be used with an adjustable hinge apparatus 10 in accordance with the present invention.

Illustratively, the adjustable hinge apparatus 10 is mounted on the support pin 13 which extends across a back side 48 of the cooker 12 substantially parallel to the back edge 32 of the plates 18, 20, 22. As shown in FIG. 1, the support pin 13 is supported by a pin mount 50 which is coupled to the lower housing 14. The support pin 13 provides a common pivot axis 52 (FIG. 2) for pivoting movement as shown by arrow 53, of the hinge apparatus 10 and the plates 18, 20, 22. Preferably, a spacer 54 is coupled to the support pin 13 to prevent sliding movement of the apparatus 10 on the support pin 13 parallel to the common pivot axis 52. See FIG. 2. However, it is contemplated that a variety of holding devices may be used to prevent sliding movement of the apparatus 10 parallel to the pivot axis 52.

Referring to FIG. 2, the hinge apparatus 10 includes multiple hinges 56, 58, 60. Each hinge 56, 58, 60 includes an innermost surface 62 facing in the direction of the pin mount 50 and an opposite outermost surface 64. Additionally, an elliptical-shaped pivot aperture 66 extends between the outermost surface 64 and the innermost surface 62 of the respective hinges 56, 58, 60. Each pivot aperture 66 is sized for extension of the support pin 13 therethrough to individually mount the hinges 56, 58, 60. The pivot apertures 66 formed through the hinges 56, 58, 60 also include a highest portion 68 and a lowest portion 70 and are sized for free floating sliding movement of the hinges 56, 58, 60 on the support pin 13 between the highest portion 68 and the lowest portion 70. Thus, the hinges 56, 58, 60 can be raised and lowered in a generally linear manner substantially perpendicular to the common pivot axis 52 as shown by arrows 67, 69, 71. See FIG. 1. The hinges are further formed to tilt in order to assume an ajar orientation, as shown by arrow 73, (FIG. 3) to maintain good mechanical contact between plates 18, 20, 22 and foodstuff 75 positioned therebetween.

Figure 3:
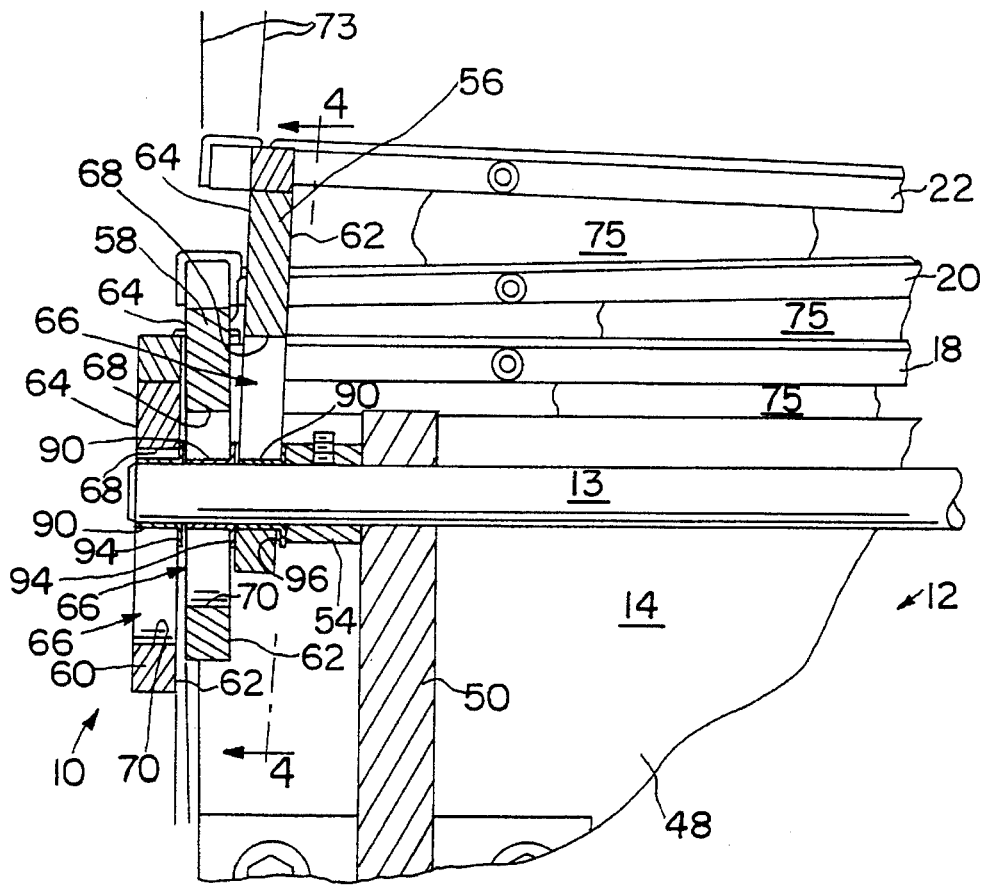
FIG. 3 is a partial cross-sectional view of the hinge apparatus taken along lines 3—3 of FIG. 1, showing the apparatus having three hinges each having a pivot aperture, the support pin extending through the apertures, the independent sliding movement of the block portions on the support pin, and independent movement of the hinges to an ajar orientation relative to one another.
Figure 4:
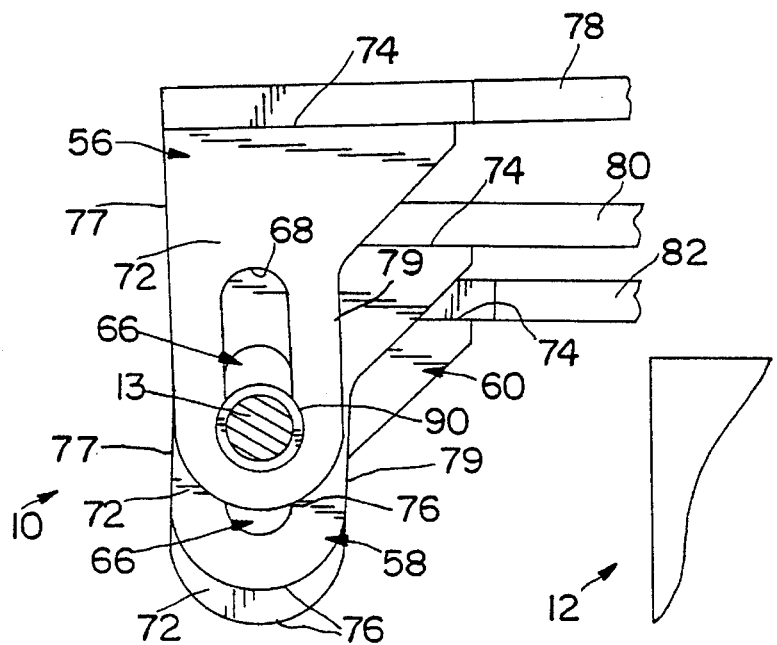
FIG. 4 is a side view of the hinge apparatus taken along lines 4—4 of FIG. 3 showing the relative positioning of the hinges on the support pin.

As best shown in FIG. 4, each of the hinges 56, 58, 60 has a hinge block 72 that includes a top edge 74, a bottom edge 76, opposite side edges 77, 79 extending between the top and bottom edges 74, 76. In addition, each hinge 56, 58, 60 has an arm 78, 80, 82 which is coupled to the top edge 74 of its respective hinge block 72 and that extends outwardly therefrom. Referring now to FIG. 3, the pivot aperture 66 is preferably formed within the hinge block 72 so that the support pin 13 normally rests against the highest portion 68 of the pivot aperture 66 to align the arm 78, 80, 82 with the bottom side 24 of the heating plate to which the hinge 56, 58, 60 is attached. Preferably, the height of the hinge block 72 between the highest portion 68 of aperture 66 and the top side 26 is varied depending upon the positioning of the corresponding heating plate 18, 20, 22.

Illustratively, each arm 78, 80, 82 includes a first end 84 coupled to its respective hinge block 72 and an opposite end 86 coupled to the bottom side 24 of one heating plate 18, 20, 22. See FIG. 2. In addition, each arm 78, 80, 82 includes central portion 88 that is offset at an angle and which extends between the opposite ends 84, 86. It is understood that the extent and direction of the offset in the central portion 88 will be dependent upon the distance of the hinge block 72 on the support pin 13 from the side 36, 38 of the respective heating plate 18, 20, 22 where it is attached. It is contemplated that the arms 78, 80, 82 may be attached to the heating plates 18, 20, 22 at a variety of locations using a variety of well known attachment means 87 such as tabs, pins, and rods so long as the arms 78, 80, 82 are securely fastened to said plates 18, 20, 22.

Further, hinges 56, 58, 60 are positioned on the support pin 13 successively, so that hinge 56 is an inner hinge, hinge 58 is a central hinge, and hinge 60 is an outer hinge. See FIG. 3. The inner hinge 56 has its innermost surface 62 facing the spacer 54 and its outermost surface 64 facing the innermost surface 62 of central hinge 58. Likewise, outer hinge 60 has its innermost surface 62 facing the outermost surface 64 of the central hinge 58. Thus, the hinges 56, 58, 60 of each hinge apparatus 10 are positioned in spaced-apart relation and hinged on the support pin 13 independently of one another.

The hinges 56, 58, 60 are separated on pin 13 by bushings 90. Each bushing 90 includes a cylindrical sleeve 92 sized for extension of the support pin 13 therethrough and an annular rim 94 extending outwardly from the sleeve 92. The sleeve 92 as shown in FIG. 4 which houses the support pin 13, extends into the pivot aperture 66 of the hinge 56. In addition, as shown in FIG. 3, the annular rim 94 includes an underside 96 formed for engagement with the innermost surface 62 of the hinge block 72 and an upper side 98 formed for engagement with the outermost surface 64 of the adjacent hinge 56, 58 or spacer 54. Preferably, bushings 90 are constructed of a low-frictional plastic which allow the hinges 56, 58, 60 to freely slide on the support pin 13 independently of the adjacent hinges 56, 58, 60. It is understood each bushing 90 may be constructed from a wide variety of materials so long as linear and pivoting movement of each hinge 56, 58, 60 is permitted on the support pin 13. It is further contemplated that a wide variety of low-friction hinge separators may be incorporated into the hinge apparatus 10 of the present invention to promote independent movement of the hinges 56, 58, 60.

In operation, the independent hinges 56, 58, 60 of the hinge apparatus 10 in accordance with the present invention are positioned in a mirror-image relationship on opposite corners 166, 168 of the backside of cooker 12. See FIG. 1. This position prevents any relative horizontal movement between the plates 18, 20, 22 which would damage foodstuff 75 positioned therein. A user, however, placing items 75 within the cooker 12 must only lift the front edge 28 of one plate. The plates that are stacked upon on the chosen plate will pivot as one about the support pin 13. Once the items 75 have been situated on the plate, the user must only lower the front edge. The hinges 56, 58, 60 will automatically adjust on the support pin independently of one another to vary the spacing between the plates 18, 20, 22 to accommodate the items 75. Moreover, the plates 18, 20, 22 will tilt to ajar orientation to maintain mechanical contact between the items 75 and said plates 18, 20, 22.

An alternative embodiment of the hinge apparatus in accordance with the present invention is illustrated in FIGS. 5–6. The apparatus 110 provides a hinge 112 and an arm 113 similar to those previously described. However, hinge 112 is further formed to include a rod slot 114 extending through the arm 113 and the top edge 74 of the hinge 112. As best shown in FIG. 6, the rod slot 114 extends through the hinge block 72 and into the elliptical pivot aperture 66. Illustratively, a latch spring slot 116 also extends through the first end 84 of arm 113. Preferably, the latch spring slot 116 is positioned adjacent the top edge 74 of hinge 112. It is understood that latch spring slot 116 may however be positioned through side edge 77 of hinge 112.

The hinge apparatus 110 further includes an annular hinge bearing 118 situated within the elliptical pivot aperture 66 and surrounding support pin 13. The bearing 118 is sized to allow the hinge 112 to slide thereon. See FIG. 5. The hinge bearing 118 is formed to include an innermost side 120, an opposite outermost side 122, a circumferential edge 124 extending about the circumference of the bearing 118, a hole 126 extending between the innermost and outermost sides 120, 122, and a threaded aperture 128 extending through the circumferential edge 124 toward the hole 126. The support pin 13 having a diameter' corresponding to that of the bearing hole 126, extends through the hole 126 of the hinge bearing 118. Illustratively, the threaded aperture 128 is positioned so that it faces the highest portion 68 of the elliptical pivot aperture 66.

As best shown in FIG. 5, hinge apparatus 110 includes an adjusting rod 130. The adjusting rod 130 includes opposite ends 132, 134 and a center portion 136 extending therebetween. The center portion 136 is formed to include a plurality of spaced-apart notches 138 extending therein. Moreover, one of the opposite ends 134 includes threads 135 sized for engagement with the threaded aperture 128 of the bearing 118. Illustratively, the adjusting rod 130 forms a mounting apparatus 140 by extending through the rod slot 114 formed in the arm 113 and hinge 113 and into the threaded aperture 128 for secure engagement with the hinge bearing 118. Thus, the notches 138 of the center portion 136 move into and out of the rod slot 114 as the hinge block 72 moves on the support pin 13, as shown by arrow 119 in FIG. 6, substantially perpendicular to the pivot axis 52. In addition, the mounting apparatus 140 and the hinge 112 pivot as a unit about the support pin 13.

Illustratively, hinge apparatus 110 further includes an adjusting rod latch 142 for each hinge 56, 58, 60 of the hinge apparatus 10. The latch 142 is best illustrated in FIG. 5 and comprises a flat retaining portion 144 positioned across the arm 113, an upstanding first tab 146 positioned at one opposite end 148, a second tab 150 extending into the spring slot 116 at the second opposite end 152, and an intermediate portion 154 extending along the side wall 77 between the retaining portion 144 and the second tab 150.

The retaining portion 144 of the latch 142 is formed to include a locking slot 156 positioned over the rod slot 114 so that the adjusting rod 130 extends through the locking slot 156 and into the block 72. The locking slot 156 includes an adjusting end 158 having a diameter suitable for sliding movement of the adjusting rod 130 therethrough and an opposite locking end 160. The locking end 160 of the locking slot 156 has a diameter less than that of the adjusting rod 130, but sized to accept placement of the notches 138 of the center portion 136 therein. Therefore, the locking end 160 of the retaining portion 144 holds the adjusting rod 130 in a fixed position and thus the hinge bearing 118 a fixed distance from the arm 113. Thus, the top side 74 of the hinge block 72 is prevented from moving closer to or away from the support pin 13.

In addition, a spring 161 is positioned within the spring slot 116 to normally bias the second tab 150 away from the side edge 77 of the hinge block 72 and thus the locking end 160 of the locking slot 156 into engagement with the adjusting rod 130. To unlock the mounting apparatus 140 the user must only pull the first tab 113 away from the adjusting rod 130 and over the arm 113. This movement slides the adjusting end 158 of the locking slot 156 over the adjusting rod 130 so that the block may be linearly raised or lowered on the hinge bearing 118. If the block 72 is raised, the hinge bearing 118 is relocated in the elliptical pivot aperture 66 toward its lowest portion 70 and thus the top side 74 of the body 72 slides over the notches 138 of the adjusting rod 130. The user must only release the first tab 113 to spring bias the locking end 160 into engagement with the notches 138 of the adjusting rod 130.

The retaining portion 144 of the latch 142 is movably attached to the arm 113. As shown in FIG. 5, the latch 142 includes retaining slots 162 therethrough. Illustratively, threaded apertures 163 are also formed within arm 113. Therefore, attachments 164 such as pins, screws, rods, nails, or rivets may extend through the retaining slots 162 for sliding movement therein and to couple the flat retaining portion 144 to arm 113.

Further, once the items 75 have been placed upon the heating element 42, the user must simply lower the front edge 28. The hinges 56, 58, 60 again pivot as one, to return the plates 18, 20, 22 to their stacked position. Advantageously, the hinge apparatus 10 in accordance with the present invention, permits the individual plates 18, 20, 22 to self-adjust to meet the various heights of the foodstuff 75 thereon. Thus the plates 18, 20, 22 both float vertically with respect to one another and tilt to ajar orientations to maintain good mechanical contact between the heating plate and the foodstuff.

Although the invention has been described in detail with reference to certain preferred embodiments, variations and modifications exist within the scope and spirit of the invention as described and defined in the following claims.

What is claimed is:

1. An apparatus for use with a cooker having multiple stacked heating plates supporting foodstuff and a support pin mounted on the cooker to form a common pivot axis about which the plates pivot, the apparatus comprising an array of hinges being positionable adjacent one another on the support pin, each hinge having a hinge block formed to include a pivot aperture sized for receiving the support pin therein and an arm affixed to the hinge block, the arms of adjacent hinges being attachable to consecutive stacked heating plates and the hinge block of each hinge being formed for sliding movement on the support pin substantially perpendicular to the pivot axis and independently of the adjacent hinges so that the plates are movable relative to one another to accommodate different thickness of foodstuff therebetween.

2. The apparatus of claim 1, further comprising means for separating the hinges from one another so that each hinge block is free to tilt to an ajar orientation relative to adjacent hinge blocks.

3. The apparatus of claim 2, wherein the separating means includes a bushing movably mounted on each hinge and formed for extension of the support pin therethrough.

4. The apparatus of claim 2, further comprising means for preventing sliding movement of the hinges parallel to the common pivot axis of the support pin.

5. The apparatus of claim 4, wherein the preventing means includes spacers formed for secure attachment on the support pin.

6. The apparatus of claim 1, wherein each arm includes a first end formed for attachment with one of the consecutive plates, an opposite end attached to one of the hinge blocks, and a central portion offset at a predetermined angle positioning the hinge blocks in a side-by-side orientation parallel to the pivot axis and the first opposite ends of the arms in a stacked orientation relative to one another substantially perpendicular to the pivot axis.

7. The apparatus of claim 6, wherein the hinge blocks include a top edge, an opposite bottom edge, and side edges extending between the top and bottom edges and each arm is attached to the top edge of the respective hinge block.

8. The apparatus of claim 1, wherein the hinge block of each hinge includes a top edge and a bottom edge and the aperture is elliptical in shape and includes a highest portion adjacent the top edge and a lowest portion adjacent the bottom edge.

9. The apparatus of claim 8, further comprising means for latching the hinge block of each hinge on the support pin so that the support pin is locked within the aperture between the highest portion and the lowest portion.

10. The apparatus of claim 9, wherein the block portion is formed to include a rod slot extending between the top edge and the highest portion of the pivot aperture and the latching means includes an adjusting rod that extends through the rod slot and is mounted on the support pin, and an adjusting rod latch having a retaining portion formed to securely fasten the adjusting rod within the rod slot so that the top edge of the hinge block is prevented from moving perpendicular relative to the support pin on the common pivot axis.

11. The apparatus of claim 10, wherein the adjusting rod is mounted on the support pin by an annular hinge bearing situated within the pivot aperture, the hinge bearing is formed for extension of the support pin therethrough and includes a circumferential edge having an aperture sized for extension of the adjusting rod therein.

12. A cooker apparatus comprising a housing, an array of stackable heating plates positioned consecutively atop the housing, a support pin mounted on the housing and providing a common pivot axis for the heating plates, and an array of hinges, each hinge connecting one of the array of plates for rotation about the support pin, each hinge including a hinge block having a pivot aperture sized for receiving the support pin therein and an arm mountably engaging one of the consecutively stacked heating plates so that each hinge block can pivot about the common pivot axis and slide on the support pin substantially perpendicularly to the common pivot axis to establish different heights between the plates.

13. The apparatus of claim 12, further comprising means for separating the hinges from one another to permit tilting movement of each hinge block on the support pin to an ajar orientation relative to adjacent hinge blocks so that the plates freely tilt relative to one another.

14. The apparatus of claim 13, wherein the separating means includes a bushing movably mounted on each hinge about the support pin.

15. The apparatus of claim 14, wherein each hinge block includes an innermost surface and an outermost surface and each bushing includes a cylindrical sleeve surrounding the support pin and an annular rim that engages the innermost surface of the hinge block.

16. The apparatus of claim 13, further comprising means for preventing sliding movement of the hinges on the support pin parallel to the common pivot axis.

17. The apparatus of claim 14, wherein the hinges are positioned in two sets and the preventing means includes a pair of spacers situated in spaced-apart relation to one another on the support pin, the spacers being located between the two sets of hinges.

18. The apparatus of claim 12, wherein the hinges are situated in two sets on opposite ends of the support pin and the hinges positioned on one end of the support pin are arranged in a mirror-image orientation relative to the hinges positioned on the opposite end of the support pin.

19. The apparatus of claim 18, wherein each set includes three hinges.

20. The apparatus of claim 18, wherein the stacked heating plates include a lower plate, a middle plate, and a top plate and each set includes an inner hinge formed for attachment with the top plate, a center hinge formed for attachment with the middle plate, and an outer hinge formed for attachment with the lower plate.

21. The apparatus of claim 18, wherein each arm includes a first end formed for attachment with one of the consecutive plates, an opposite end attached to one of the hinge blocks, and a center means for permitting the block portions to be positioned in side-by-side orientation on the support pin and the first opposite ends of the arms to be stacked substantially perpendicular to the support pin.

22. The apparatus of claim 21, wherein the hinge blocks include a top edge, an opposite bottom edge, and side edges extending between the top and bottom edges and the second end of the arms are attached to the top edge of the hinge blocks.

23. The apparatus of claim 12, wherein each block includes a top edge and a bottom edge and the aperture is elliptical in shape and includes a highest portion adjacent the top edge and a lowest portion adjacent the bottom edge.

24. The apparatus of claim 23, further comprising means for latching the support pin within the aperture between the highest portion and the lowest portion.

25. An apparatus for connecting an array of stackable plates for rotation on a support pin about a common pivot axis, the apparatus comprising an array of hinges situated on the support pin adjacent one another, each hinge having a hinge block including a pivot aperture sized for receiving the support pin therein and an arm, each arm including a first end formed for attachment with one of the stackable plates, an opposite end attached to one of the hinge blocks, and a central portion offset between the opposite ends at a predetermined angle positioning the block portions in side-by-side orientation parallel to the support pin and the first opposite ends of the arms in a stacked substantially perpendicular orientation to the support pin so that each hinge block can pivot about the common pivot axis and slide on the support pin substantially perpendicularly to the common pivot axis to establish different heights between the plates, and and bushings positioned on the support pin between the hinges so that each hinge block is free to tilt to an ajar orientation relative to adjacent hinge blocks.

26. The apparatus of claim 25, wherein the stacked plates include a lower plate, a middle plate, and a top plate and the hinges are arranged in two sets, each set includes an inner hinge formed for attachment with the top plate, a center hinge formed for attachment with the middle plate, and an outer hinge formed for attachment with the lower plate.

27. The apparatus of claim 26, wherein the hinges in each set are arranged in a mirror-image orientation relative to one another.

28. A cooker apparatus having a stationary heating plate and multiple movable stacked heating plates for supporting foodstuffs to be heated, the apparatus comprising a cooker having a frame equipped with a horizontally extending stationary heating plate;

a plurality of stacked heating plates overlying the stationary plate and each of the stacked heating plates equipped with at least one pivot aperture;

each of the stacked heating plates pivotally mounted to the cooker frame through its pivot aperture for horizontal pivoting about its aperture with respect to the stationary horizontally extending heating plate; and the at least one pivot aperture of at least one of the plurality of stacked heating plates being elongated to permit vertical movement of at least one stacked heating plate with respect to the stationary horizontally extending heating plate to accommodate different thicknesses of foodstuffs.

29. The cooker apparatus of claim 28, wherein each of the stacked plates has at least two similarly shaped pivot apertures horizontally spaced from one another to define a horizontal axis for the pivoting with respect to the stationary heating plate.

30. The cooker apparatus of claim 29, wherein all of the apertures of the stacked heating plates are elongated to provide for vertical movement of each of the stacked heating plates with respect to the stationary horizontal heating plate to accommodate different thicknesses of foodstuffs.

31. The cooker apparatus of claim 28, wherein all of the apertures of the stacked heating plates are elongated to provide for vertical movement of each of the stacked heating plates with respect to the stationary horizontal heating plate to accommodate different thicknesses of foodstuffs.

32. The cooker apparatus of claim 28, wherein the frame is provided with a single pivot pin that extends through the pivot apertures to provide a single pivot axis for all of the stacked heating plates.

33. The cooker apparatus of claim 29, wherein the frame is provided with a single pivot pin that extends through the pivot apertures to provide a single pivot axis for all of the stacked heating plates.

34. The cooker apparatus of claim 30, wherein the frame is provided with a single pivot pin that extends through the pivot apertures to provide a single pivot axis for all of the stacked heating plates.

35. The cooker apparatus of claim 31, wherein the frame is provided with a single pivot pin that extends through the pivot apertures to provide a single pivot axis for all of the stacked heating plates.

36. The cooker apparatus of claim 28, wherein the elongated pivot aperture in at least one stacked plate is separated horizontally from the elongated pivot aperture in another stacked plate to permit tilting of one of the stacked plates with respect to another stacked plate.

37. The cooker apparatus of claim 29, wherein the elongated pivot aperture in at least one stacked plate is separated horizontally from the elongated pivot aperture in another stacked plate to permit tilting of one of the stacked plates with respect to another stacked plate.

38. The cooker apparatus of claim 34, wherein the elongated pivot apertures in at least one stacked plate are separated horizontally from the elongated pivot apertures in another stacked plate to permit tilting of one of the stacked plates with respect to another stacked plate.

39. The cooker apparatus of claim 33, wherein the elongated pivot aperture in at least one stacked plate is separated horizontally from the elongated pivot aperture in another stacked plate to permit tilting of one of the stacked plates with respect to another stacked plate.

40. The cooker apparatus of claim 35, wherein the elongated pivot apertures in at least one stacked plate are separated horizontally from the elongated pivot apertures in another stacked plate to permit tilting of one of the stacked plates with respect to another stacked plate.

41. The cooker apparatus of claim 32, wherein the elongated pivot aperture in at least one stacked plate is separated horizontally from the elongated pivot aperture in another stacked plate to permit tilting of one of the stacked plates with respect to another stacked plate.

42. A hinge assembly for a cooker apparatus having a stationary horizontally extending heating plate having a frame and stacked heating plates for supporting foodstuffs to be heated, the assembly comprising a plurality of hinges, and at least one hinge being affixed to each of the stacked heating plates and equipped with at least one pivot aperture;

each of the hinges pivotally mounted to the frame through its pivot aperture for horizontal pivoting about its aperture with respect to the stationary horizontally heating plate; and the at least one pivot aperture of the plurality of hinges being elongated to permit vertical movement of the hinge and attached heating plate with respect to the stationary horizontal heating plate to accommodate different thickness of foodstuffs.

43. The hinge assembly of claim 42, wherein at least two hinges having similarly shaped pivot apertures are affixed to at least one of the staked plates so that at least two similarly shaped pivot apertures are horizontally spaced from one another to define a horizontal axis for the pivoting with respect to the stationary heating plate.

44. The hinge assembly of claim 43, wherein all of the apertures of the hinges are elongated to provide for vertical movement of each of the hinges with respect to the stationary horizontal heating plate to accommodate different thicknesses of foodstuffs.

45. The hinge assembly of claim 42, wherein all of the apertures of the hinges are elongated to provide for vertical movement of each of the hinges with respect to the stationary horizontal heating plate to accommodate different thicknesses of foodstuffs.

46. The hinge assembly of claim 42, wherein the frame is provided with a single pivot pin that extends through the pivot apertures to provide a single pivot axis for all of the hinges.

47. The hinge assembly of claim 43, wherein the frame is provided with a single pivot pin that extends through the pivot apertures to provide a single pivot axis for all of the hinges.

48. The hinge assembly of claim 44, wherein the frame is provided with a single pivot pin that extends through the pivot apertures to provide a single pivot axis for all of the hinges.

49. The hinge assembly of claim 45, wherein the frame is provided with a single pivot pin that extends through the pivot apertures to provide a single pivot axis for all of the hinges.

50. The hinge assembly of claim 42, wherein at least two hinges are affixed to at least one of the stacked plates and the elongated pivot aperture in at least one hinge is separated horizontally from the elongated pivot aperture in another hinge affixed to the plate to permit tilting of one of the stacked plates with respect to another stacked plate.

51. The hinge assembly of claim 43, wherein the elongated pivot aperture in at least one hinge is separated horizontally from the elongated pivot aperture in another hinge to permit tilting of one of the stacked plates with respect to another stacked plate.

52. The hinge assembly of claim 48, wherein the elongated pivot aperture in at least one hinge is separated horizontally from the elongated pivot aperture in another hinge to permit tilting of one of the stacked plates with respect to another stacked plate.

53. The hinge assembly of claim 47, wherein the elongated pivot aperture in at least one hinge is separated horizontally from the elongated pivot aperture in another hinge to permit tilting of one of the stacked plates with respect to another stacked plate.

54. The hinge assembly of claim 49, wherein at least two hinges are affixed to at least one of the stacked plates and the elongated pivot aperture in at least one hinge is separated horizontally from the elongated pivot aperture in another hinge affixed to the plate to permit tilting of one of the stacked plates with respect to another stacked plate.

55. The hinge assembly of claim 46, wherein at least two hinges are affixed to at least one of the stacked plates and the elongated pivot apertures in at least one stacked plate are separated horizontally from the elongated pivot aperture in another hinge affixed to the plate to permit tilting of one of the stacked plates with respect to another stacked plate.

* * * * *